United States Patent [19]

Bischofberger et al.

[11] Patent Number: 5,290,990
[45] Date of Patent: Mar. 1, 1994

[54] SEAM WELDING MACHINE FOR JOINING SHEET BLANKS TOGETHER

[75] Inventors: Walter Bischofberger, Niederweningen; Karl Wueger, Uster, both of Switzerland

[73] Assignee: Elpatronic AG, Zug, Switzerland

[21] Appl. No.: 917,752

[22] Filed: Jul. 21, 1992

[30] Foreign Application Priority Data

Aug. 15, 1991 [CH] Switzerland ............. 02 410/91-0
Jun. 19, 1992 [CH] Switzerland ............. 01 948/92-2

[51] Int. Cl.⁵ .......................................... B23K 1/08
[52] U.S. Cl. ............................... 219/82; 219/64; 219/81
[58] Field of Search .............. 219/64, 81, 82, 83, 219/84

[56] References Cited

U.S. PATENT DOCUMENTS

| | | | |
|---|---|---|---|
| 2,800,568 | 7/1957 | Cooper | 219/82 |
| 2,908,802 | 10/1959 | Watter et al. | 219/81 |
| 2,957,071 | 10/1960 | Cooper et al. | 219/82 |
| 3,102,189 | 8/1963 | Jones et al. | 219/82 |
| 3,510,045 | 5/1970 | Petros et al. | 219/82 |
| 5,081,331 | 1/1992 | Beyer et al. | 219/64 |
| 5,122,629 | 6/1992 | Stieger | 219/64 |
| 5,125,554 | 6/1992 | Geiermann et al. | 219/82 |

FOREIGN PATENT DOCUMENTS 0254028  6/1987  European Pat. Off.
54-146245 11/1979  Japan ................... 219/81

Primary Examiner—Geoffrey S. Evans
Attorney, Agent, or Firm—McCormick, Paulding & Huber

[57] ABSTRACT

The seam welding machine with welding arrangement 10 has a lower part (1) and an upper (2). Load-bearing components are upper and lower longitudinal girders (20, 21) with a rigid connection (3, 4) between them. For clamping sheet blanks (7, 8) for welding, two clamping blocks are provided, each with upper and lower pressure beams (24, 25); at least the upper pressure beams (24) can be raised and lowered by means of jacks. For longitudinal transport of workpieces (7, 8) along the weld axis (Z), each beam has a feed unit (40, 41). Each feed unit comprises a longitudinal guide extending in the direction of the axis (Z), a slide, with clamping devices, guided on this longitudinal guide, and a reversible linear drive connected to the slide.

11 Claims, 6 Drawing Sheets

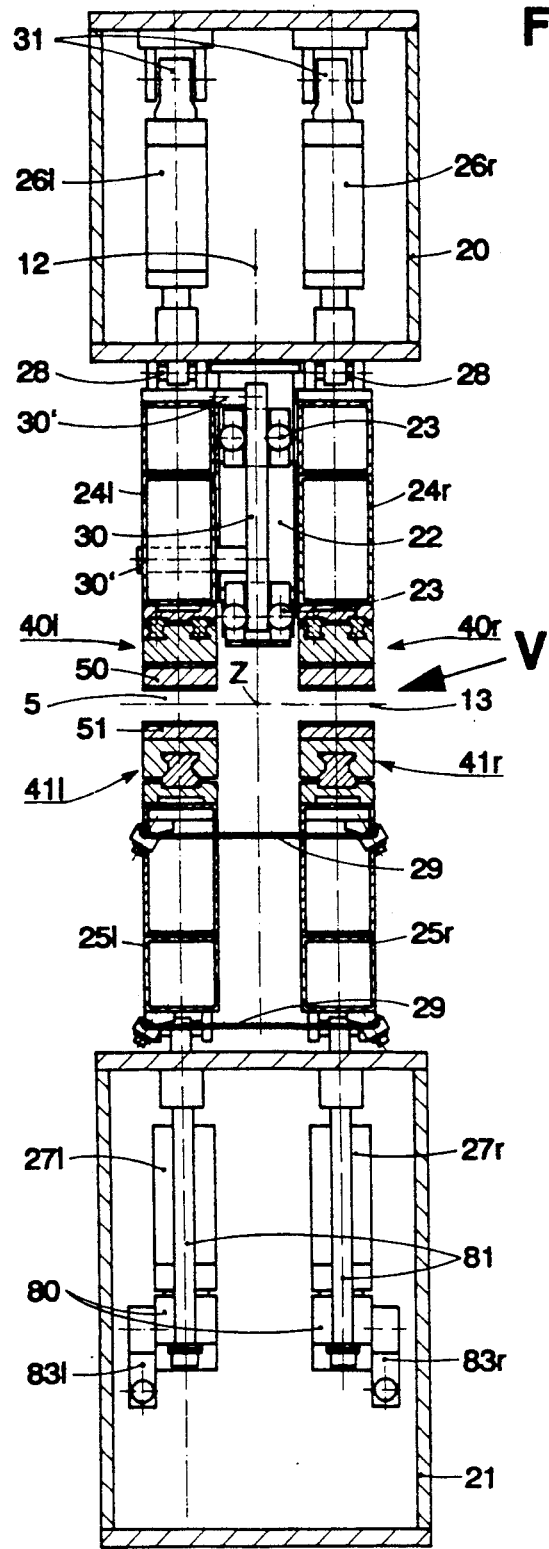
Fig. 3
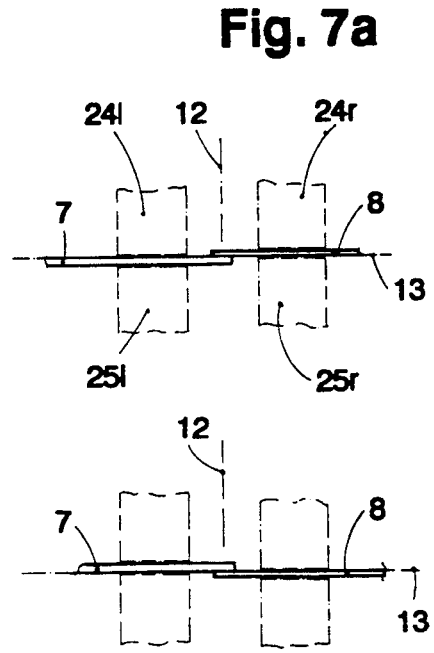
Fig. 7a
Fig. 7b

1

SEAM WELDING MACHINE FOR JOINING SHEET BLANKS TOGETHER

BACKGROUND OF THE INVENTION

The invention relates to a seam welding machine for joining together with a seam weld sheet blanks clamped side by side, comprising
   a welding arrangement defining a weld axis,
   two clamping blocks arranged on either side of the weld axis for the sheet blanks, each with upper and lower pressure beams and upper and lower clamping devices defining a receiving gap for the sheet blanks and,
   a longitudinal transport system for advancing the clamped sheet blanks in the direction of the weld axis.

Seam welding machines of this kind are used in particular for the production of body blanks, often involving the joining together of sheet blanks of different grade and/or thickness. Before the sheet blanks are clamped in the clamping blocks of the machine, the sheet edges which are to be welded must be precisely aligned in relation to one another and to the weld axis, and this alignment must be sustained during the longitudinal feed, i.e. during the welding process, in order not to impair the quality of the welded seam. Account has to be taken of the fact that the workpieces may be subjected to considerable transverse forces in the course of welding, particularly in the case of mash seam welding between electrode wheels. Furthermore, in the case of seam welding by laser beam, the butting edges which are to be welded have to be held together with high transverse forces.

In a known welding machine of the aforesaid kind, a carriage, guided on the machine bed and capable of being longitudinally traversed as a complete unit, is provided for clamping and advancing the sheet blanks U.S. Pat. No. 5,081,331. The carriage essentially has four (two lower and two upper) pressure beams provided with the clamping devices, with hydraulic clamping cylinders fitted in each of the upper beams. With this type of construction the pressure beams can only be joined together at their ends. The beams themselves must therefore be rigid enough in their construction not to be subject to unacceptable deformations due to the (both vertical and horizontal) forces exerted on them during clamping and welding. In practice, therefore, the overall length of the clamping blocks — and hence the length of the welded seams which can be produced — is somewhat limited, since to increase the length still further a carriage of disproportionately large dimensions, and corresponding weight, would be required. In addition the hydraulic clamping cylinders fitted to the traversing carriage must be connected via flexible pressure hoses, involving additional expense and possible complications.

SUMMARY OF THE INVENTION

Taking as its starting-point a seam welding machine of the aforesaid kind, the present invention sets out to propose a more convenient construction in which the forces occurring at the clamping blocks can be well controlled, and the restriction of overall length and working length associated with the known machine no longer applies.

According to the invention the two upper pressure beams of the clamping blocks are carried on an upper longitudinal girder and the two lower pressure beams are carried on a lower longitudinal girder. These longitudinal girders are fixed and rigid and are rigidly connected to one another, and at least the upper beams can be raised and lowered with respect to the upper longitudinal girder by means of jacks. In addition, each pressure beam has a feed unit, and each of these feed units comprises longitudinal guides extending in the direction of the welding axis, a slide running on these guides and carrying the clamping devices, and a reversible linear drive connected to the slide.

With this construction, the total bending load does not have to be sustained by the pressure beams themselves, and vertical as well as horizontal forces are transmitted to the longitudinal girders (each longitudinal girder being common to two pressure beams). In this way, it is possible to clamp without problems even sheet blanks which are not quite flat, or a series of sheet blanks following one after another in the direction of the welding. Moreover, because the pressure beams remain stationary in the direction of the welding axis, the masses which have to be shifted along this axis are greatly reduced. Also, mobile hydraulic pressure hoses can be dispensed with.

BRIEF DESCRIPTION OF THE DRAWINGS

The invention will now be explained in more detail with the aid of the drawing, with reference to an exemplary embodiment.

FIG. 3 is a section on the line III—III in FIG. 2.

FIGS. 7a and 7b hematically depict different clamping situations for two sheet blanks, in a vertical section similar to FIG. 3.

DESCRIPTION OF THE PREFERRED EMBODIMENTS

Figure 1:
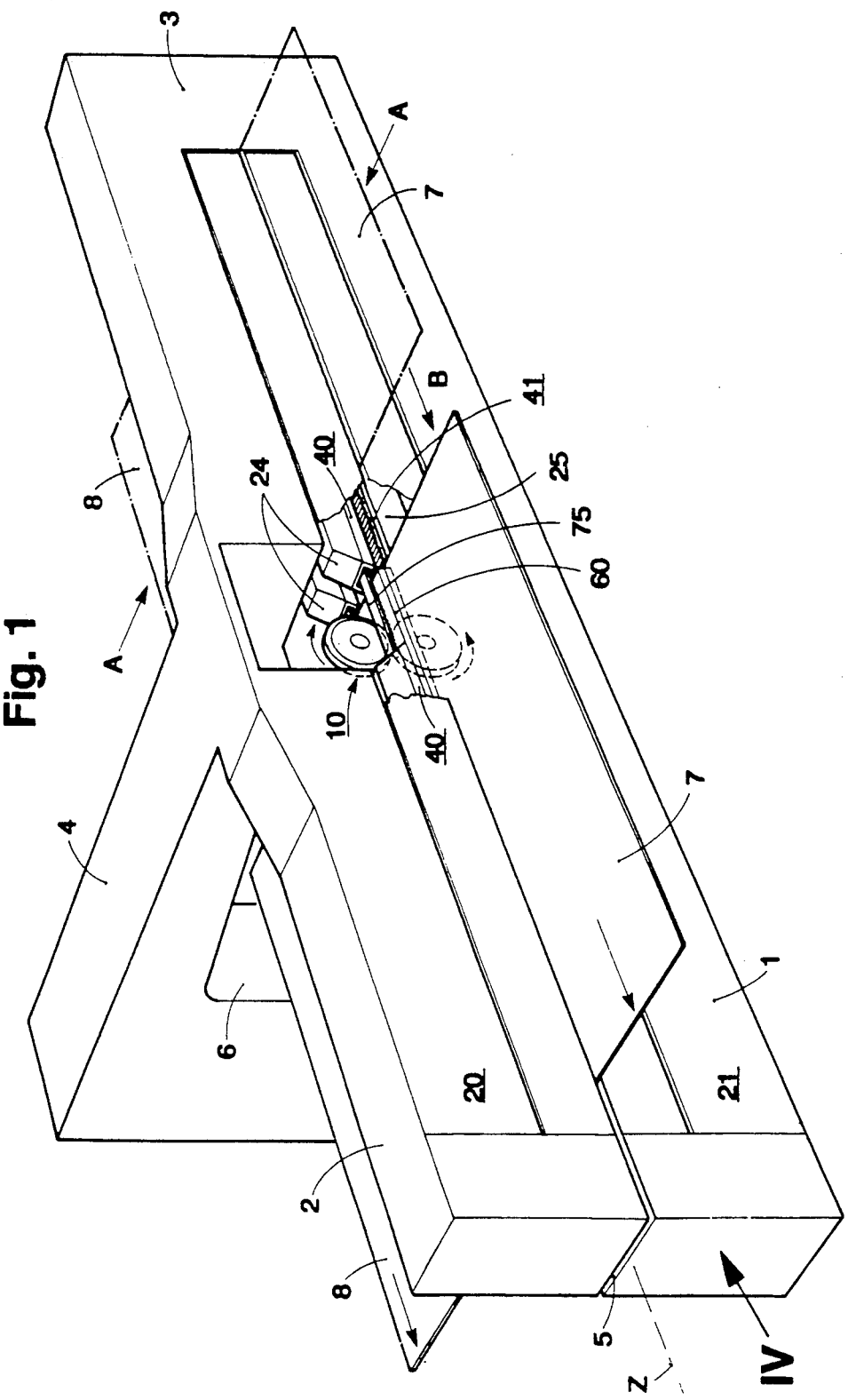
FIG. 1 is a perspective overall view of the seam welding machine according to the embodiment, with a welded body blank shortly before completion of welding and in chain-dotted outline, further workpieces about to be welded, in their initial position.

The seam welding machine illustrated in FIG. 1 with its sheet-metal casing comprises a lower part 1 and an upper part 2 between which there is a gap 5 to accommodate the workpieces. Located at the center of the machine is the welding arrangement 10, for example an electrical resistance roller seam welding arrangement, of which only the two electrode rollers are shown. (A welding arrangement of a different type, e.g. for laser welding, can in principle be located at the same position). Within the machine the welding arrangement 10 defines the welding axis Z along which the workpieces are propelled to the arrangement in the welding process to form the seam weld. Sheet blanks 7, 8 which are to be welded together are pushed into the gap 5 from both sides in the direction of the arrows A at the feed end of the machine (in the right-hand side of FIG. 1). Their edges are aligned parallel with the axis Z (with the necessary overlap if any), and then are clamped. In the clamped condition, the sheet blanks are then conveyed through the welding arrangement 10 in the direction of Arrow B, parallel with the welding axis. At the discharge end (left-hand side in FIG. 1) the clamps are then released and the welded workpieces, so called body blanks, are removed from the machine. For inserting (Arrows A) and aligning the sheet blanks 7 and 8, and also for the welding arrangement 10, devices known per se can be used which are not part of the subject-matter of the present invention and do not need to be described in detail here. As its basic load-bearing structural members the seam welding machine has upper and lower fixed rigid longitudinal girders 20 and 21 respectively (see also FIG. 3). As can be seen in the upper part of FIG. 1, the girders are cut away in the region of the welding arrangement 10 to leave room for the welding arrangement and its power transmission etc. The longitudinal girders 20 and 21 are rigidly connected to one another by a column 3 at the feed end of the machine and by a yoke 4 projecting at right angles to the longitudinal direction. At the forward end a releasable lock 3' (see FIG. 4) is preferably provided between the longitudinal girders 20 and 21 so that the welded body blanks can be removed from the gap 5 in the direction of the welding axis Z. The yoke 4 has an opening 6 to allow the sheet blanks 8 to pass. The power supply and controls of the welding arrangement 10 are conveniently routed via the yoke 4.

The rigid longitudinal girders 20 and 21 are preferably each constructed in the form of a rectangular box section, as shown in FIG. 3. In the vertical section of FIG. 3, their arrangement is essentially symmetrical with respect to a vertical plane 12 and a horizontal plane 13, with the line of intersection of the two planes of symmetry corresponding to the welding axis Z. Between the upper girder 20 and the lower girder 21 — and supported on them — are two clamping arrangements for the left-hand and right-hand sheet blanks (viewed in the direction of the Z axis). These clamping arrangements are disposed on either side of the vertical plane 12 and each comprises an uper pressure beam 24*l*, 24*r* and a lower pressure beam 25*l*, 25*r*. To convey the clamped workpieces longitudinally through the machine, a feed unit 40*l*, 40*r* and 41*l*, 41*r* is arranged on the narrow side of each pressure beam facing the gap 5, with clamping devices 50 and 51 which form the boundaries of the receiving gap 5. The feed units 40, 41 are described in detail below with reference to FIGS. 2, 4, 5 and 6.

Each of the pressure beams 24*l*, 24*r* and 25*l*, 25*r* can be raised and lowered in relation to the upper and lower longitudinal girders 20 and 21 respectively, by means of individual jacks, e.g. hydraulic cylinders 26*l*, 26*r* and 27*l*, 27*r* respectively. The piston rod of each lifting cylinder is coupled to its pressure beam by means of a pin 28, and the end lugs 31 of the cylinders are anchored to their respective girders, this connection being made directly to the upper longitudinal girder, but through a height adjustment device (described below) to the lower. Although it would be possible in principle to open and close the gap 5 (press stroke) by mounting the pressure beams so that only the two upper beams 24 could be raised and lowered on their longitudinal girder and the lower beams 25 had a fixed connection to their longitudinal girder at a predetermined height setting, it is convenient to mount all four pressure beams so as to be capable of being displaced vertically by means of jacks 26 and 27, as shown in the drawing. Other types of lifting device may, of course, be used for the pressure beams in place of the hydraulic cylinders shown in the drawing. For example, each beam can be provided with a number of toggle mechanisms jointly actuated (for each beam) e.g. hydraulically or by an electric motor via a spindle etc.

In their vertical motion with respect to the longitudinal girders 20 and 21 the pressure beams 24 and 25 are guided laterally to take up transverse forces. A number of guide columns 22 with rollers 23 (shown in the upper part of FIG. 3) project from both longitudinal girders between the adjacent pressure beams. A bar 30 which is connected to one pressure beam — in the case illustrated the left-hand beam 24*l* by arms 30', is guided between the rollers 23. Between every two guide columns 22, the left-hand and right-hand pressure beams are interconnected by means of leaf springs 29 (shown with lower part of FIG. 3) in a parallelogram arrangement, allowing (small) differences in the height settings of the beams. Such an arrangement gives the clamping arrangements excellent lateral stability, and the lateral forces acting on the workpieces especially during mash welding can be absorbed without difficulty.

Figure 2:
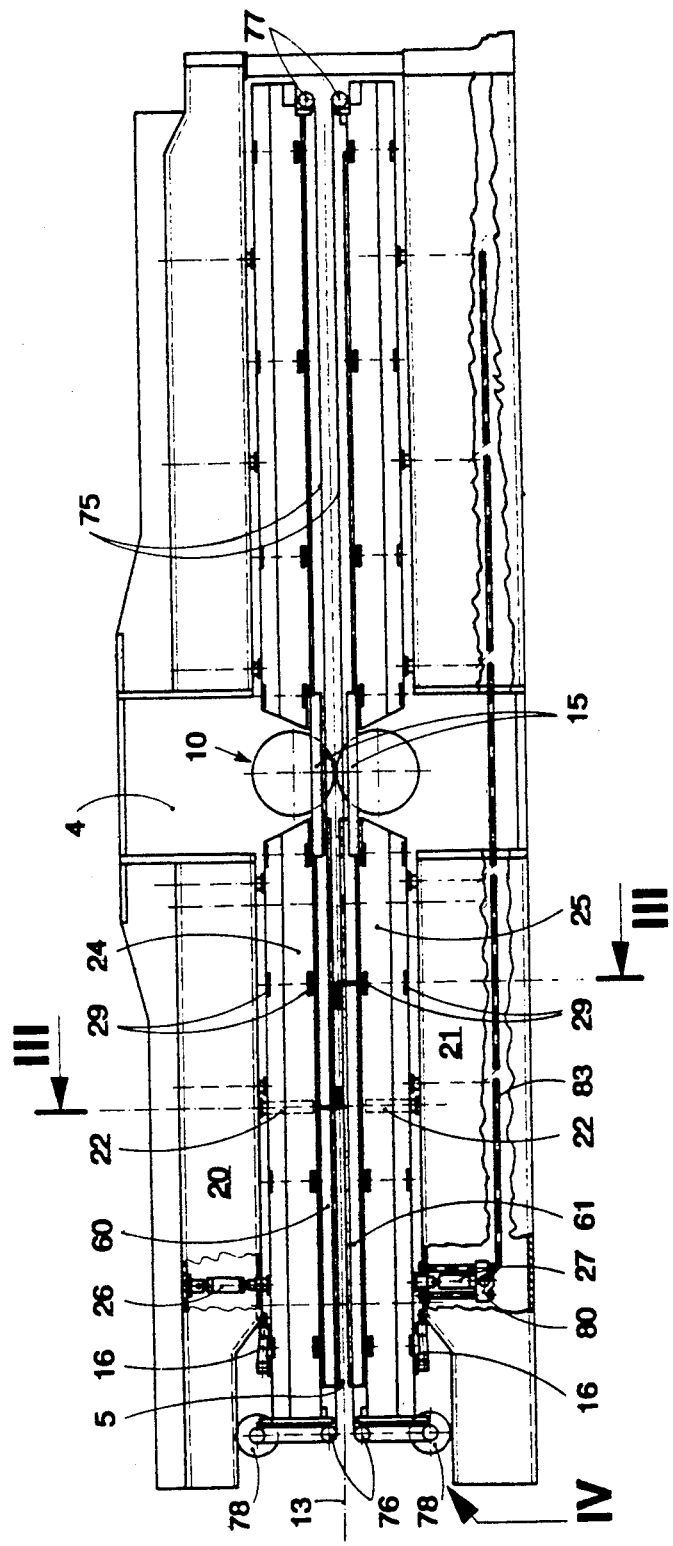
FIG. 2 is a side view of the machine, with the casing omitted.

As shown in FIG. 2, each of the pressure beams 24, 25 is interrupted in the region of the welding arrangement 10, but the front and rear sections are connected by bridges 15. Each beam is connected to the upper or lower longitudinal girder 20 or 21 by a rod 16 for positioning in the longitudinal direction.

The construction of the feed units 40, 41 will now be described with reference to FIGS. 4, 5 and 6. The left-hand and right-hand feed units are symmetrical in mirror image in their construction. The lower units 41 are of somwhat simpler construction than the upper units 40, particularly with regard to the arrangement of the clamping jaws 51, as will be described below.

Figure 4:
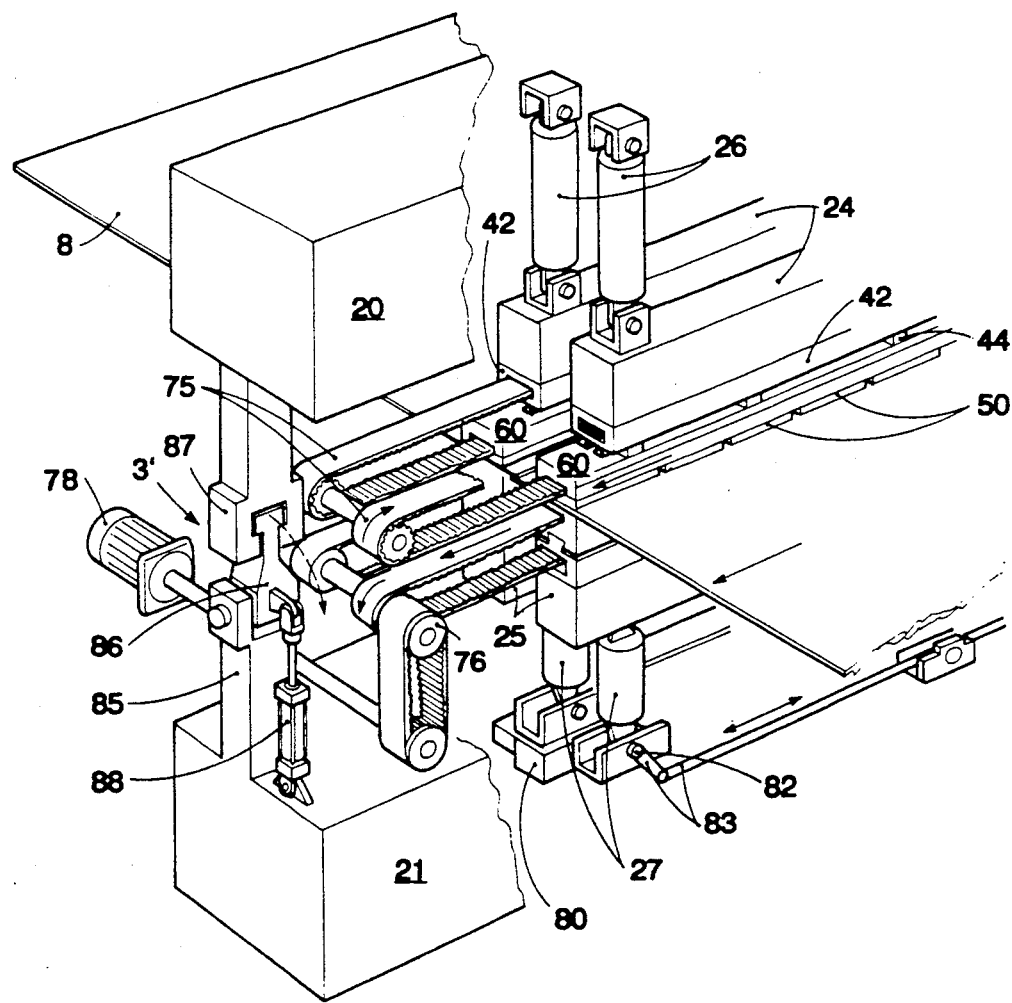
FIG. 4 is a perspective view of the front part of the machine direction of Arrow IV in FIGS. 1 and 2.
Figure 5:
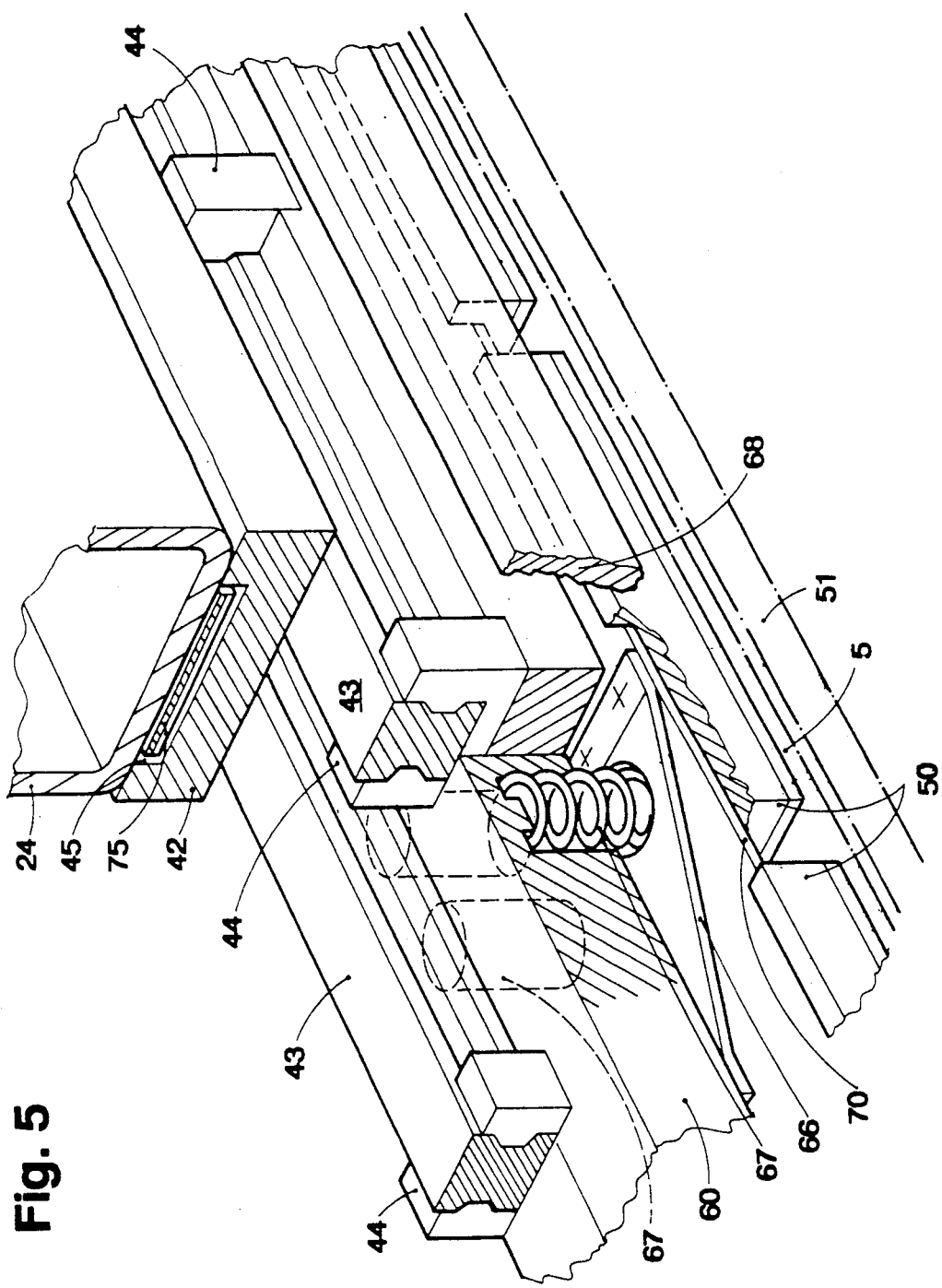
FIG. 5 is a perspective and partially cutaway view of parts of a slide with clamping jaws.
Figure 6:
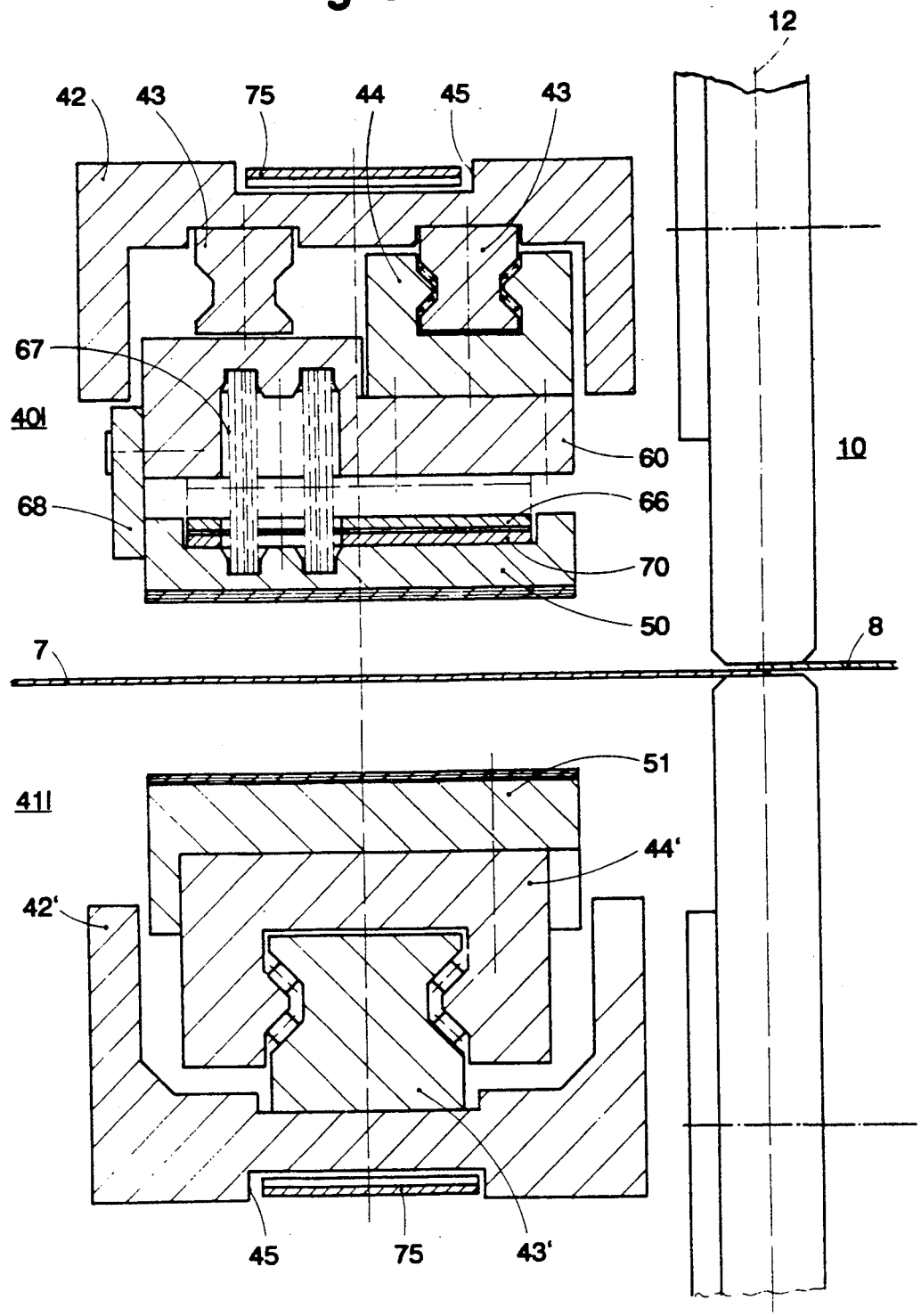
FIG. 6 is a vertical section, viewed in the direction of feed, through left-hand and upper and lower slides and their longitudinal guides.

An upper feed unit 40 according to FIGS. 4, 5 and 6 has a channel section 42 rigidly connected over its full length to the pressure beam 24. Linear guide rails 43 are fixed to the section 42, and carry a number of roller bearing units 44 which are screwed to a slide 60. The length of the slide 60 can be seen from FIG. 2 and is somewhat less than half the length of the machine.

Longitudinal movement of the slides 60 is imparted by a reversible linear drive with motor 78 (FIGS. 2, 4) and toothed belts 75. The toothed belt 75 is attached at the forward end of the slide 60 (left-hand end in FIG. 2) and extends thence over a drive pinion 76, a tail pinion 77 (at the right-hand end in FIG. 2) and back to the rear end of the slide 60 (left of center in FIG. 2). The slide 60 and toothed belt 75 thus form a closed loop. On the back of the channel section 42 a longitudinal recess is provided for the return run of the toothed belt 75.

A strip 70 of spring steel extends over the whole length of the slide 60 underneath the slide of each upper feed unit 40. Each upper clamping device 50 is subdivided into a number of separate clamping jaws which are attached to this strip 70. This attachment is releasable to enable worn clamping jaws to be replaced and a similar arrangement can be provided for the lower feed units 41 if desired. The strip 70 is connected to the slide 60 e.g. via one or more shallow leaf springs 66. A number of compression springs 67 are gripped between the slide 60 and each clamping jaw 50, and project through corresponding holes 71 in the strip 70 and in the leaf springs 66. The maximum gap between the clamping jaws 50 and slide 60 is set by studs (not shown in the drawing) fixed to the slide 60. Lateral guidance of the clamping jaws 50 is afforded by longitudinal bars 68 attached to the outer side of each slide. The described arrangement allows the clamping jaws 50 to move with respect to the slide 60, with the leaf springs 66 transmitting the tension forces during longitudinal transport of the slide under the load. Instead of the illustrated arrangement with the leaf springs 66, however, the strip 70 can itself be suitably bent over at its ends and connected to the slide 60.

As already stated, the lower feed units 41*l* and 41*r* are of similar construction, but are simpler in that only a single linear guide rail 43' with continuous roller guide 44' is provided in the channel section 42'. In place of separate clamping plates, a continuous clamping liner 51 can be directly attached to the roller guide, that is to say with intermediate compression springs omitted.

The mode of operation of the clamping arrangements which have been described is as follows: In the closure stroke the pressure beam jacks are operated to clamp the sheet blanks 7 and 8, i.e. in the illustrated example the pistons in all lifting cylinders 26 and 27 travel to their end position (cylinder stop). The lower beams 25 with their clamping jaws 51 then form a solid support for the workpieces, while on the slides 60 of the upper pressure beams the compression springs 67 are partially compressed by the clamping jaws 50, and determine the clamping force according to their spring characteristic.

It is convenient to provide an adjusting facility for the height of the anchoring lugs of the cylinders 27 at the cylinder anchor points on the lower longitudinal girder 21, as can be seen from FIGS. 2, 3 and 4, for example. Setting blocks 80, fixed to the longitudinal girder 21 by means of tension bolts 81, are provided for the cylinder lugs. Each cylinder 27 is anchored to a block 80 by an eccentric pin 82. All eccentric pins assigned to one pressure beam 25*l* or 25*r* can be pivoted together by a control rod 83. This makes it possible to set a number of end positions for the lower pressure beams 25*l*, 25*r* with respect to the horizontal plane 13, as shown schematically in FIGS. 7*a* and 7*b*. The result is that predetermined clamping forces are applied even with sheets of different thicknesses, and in particular reversed overlaps of the sheet edges to be welded can be catered for (i.e. with left-hand sheet 7 under as in FIG. 7*a*, or right-hand sheet 8 under as in FIG. 7*b*).

Lastly, the previously mentioned releasable lock 3' between upper and lower longitudinal girders at the forward end of the machine can be seen in FIG. 4. A supporting pillar 85 extending from the lower girder 21 carries a pivoting latch 86 which engages laterally in a seat 87 anchored to the upper girder 20. This provides a tension-proof connection between the ends of the girders 20 and 21. To discharge the welded sheet bar (with the load released from the pressure beams), the latch 86 is pivoted from its seat by means of a pneumatic cylinder 88.

We claim:

1. Seam welding machine for joining together with a seam weld sheet blanks clamped side by side, comprising a welding head defining a weld axis (Z),
two clamping blocks arranged on either side of the weld axis (Z) for the sheet blanks each with upper and lower pressure beams and upper and lower clamping devices defining a receiving gap (5) for the sheet blanks and
a longitudinal transport system for advancing the clamped sheet blanks in the direction of the weld axis (Z), characterized in that
the two upper pressure beams are carried by an upper longitudinal girder and the two lower pressure beams are carried by a lower longitudinal girder, said girders being fixed and rigid and rigidly connected to one another, and at least the upper pressure beams can be raised and lowered with respect to the upper longitudinal girder by jacks,
and each pressure beam has a feed unit, each unit comprising longitudinal guides (43) extending in the direction of the welding axis (Z), a slide running on the guides and carrying the clamping devices and a reversible linear drive connected to the slide.

2. Seam welding machine according to claim 1, characterized in that the two longitudinal girders are connected to one another by a yoke in the region of the welding head.

3. Seam welding machine according to claim 1, characterized in that the two longitudinal girders are provided with guide columns which face one another and which extend between the two upper beams and between the two lower beams respectively.

4. Seam welding machine according to claim 3, characterized in that one pressure beam connected with one longitudinal girder is guided by the guide columns so as to be capable of moving vertically and the other pressure beam connected with said one longitudinal girder is connected to the guided beam by entrainment members in a parallelogram arrangement.

5. Seam welding machine according to claim 4, characterized in that the entrainment members are in the form of leaf springs.

6. Seam welding machine according to claim 1, characterized in that longitudinal girders are formed as hollow sections with the jacks disposed in the interior of said longitudinal girders.

7. Seam welding machine according to claim 1, characterized in that the jacks are anchored in a height adjustable manner on the lower longitudinal girder.

8. Seam welding machine according to claim 7, characterized in that the heights of the lifting jacks can be adjusted for a series of jacks at a time, but separately for left-hand and right-hand jacks.

9. Seam welding machine according to claim 1, characterized in that in the upper feed units the clamping devices are supported on the slide through compression springs.

10. Seam welding machine according to claim 1, characterized in that the slide of each feed unit is connected at both ends to the ends of a flexible transmission element which is guided along the longitudinal guides and over return elements at their ends.

11. Seam welding machine according to claim 1, characterized in that the clamping devices of at least the upper feed units are subdivided into a plurality of clamping jaws which are displaceably connected to one another by linking members.

* * * * *